(12) United States Patent
Niv et al.

(10) Patent No.: US 6,865,312 B2
(45) Date of Patent: Mar. 8, 2005

(54) COMPACT DYNAMIC CROSSBAR SWITCH BY MEANS OF PLANAR OPTICS

(75) Inventors: Yehuda Niv, Nes Ziona (IL); Yair David, Hasharon (IL)

(73) Assignee: Planop-Planar Optics Ltd., Rehovot (IL)

(*) Notice: Subject to any disclaimer, the term of this patent is extended or adjusted under 35 U.S.C. 154(b) by 0 days.

(21) Appl. No.: 10/450,568

(22) PCT Filed: Mar. 1, 2001

(86) PCT No.: PCT/IL01/00200
§ 371 (c)(1),
(2), (4) Date: Jun. 16, 2003

(87) PCT Pub. No.: WO02/48769
PCT Pub. Date: Jun. 20, 2002

(65) Prior Publication Data
US 2004/0062471 A1 Apr. 1, 2004

(30) Foreign Application Priority Data
Dec. 14, 2000 (IL) .................... 140318

(51) Int. Cl.[7] .................... G02B 6/26; G02B 6/42

(52) U.S. Cl. .................... 385/17; 385/16; 385/20
(58) Field of Search .................... 385/16–18, 20, 385/37, 47, 140; 359/15

(56) References Cited

U.S. PATENT DOCUMENTS

| | | | | |
|---|---|---|---|---|
| 5,040,864 A | * | 8/1991 | Hong .................... | 385/16 |
| 5,321,498 A | * | 6/1994 | Song et al. .................... | 385/14 |
| 5,515,184 A | * | 5/1996 | Caulfield et al. .................... | 359/34 |
| 6,172,778 B1 | * | 1/2001 | Reinhorn et al. .................... | 359/15 |
| 6,185,015 B1 | * | 2/2001 | Reinhorn et al. .................... | 359/15 |
| 6,591,037 B2 | * | 7/2003 | Yonekubo .................... | 385/32 |
| 6,738,541 B2 | * | 5/2004 | Hoke et al. .................... | 385/17 |
| 6,754,408 B2 | * | 6/2004 | Toda et al. .................... | 385/16 |

* cited by examiner

Primary Examiner—Leo Boutsikaris
(74) Attorney, Agent, or Firm—Mark M Friedman

(57) ABSTRACT

An optical switch including: (a) a light transmissive substrate, and (b) a two-dimensional array, disposed on the light transmissive substrate, the two-dimensional array having rows and columns of reflective shutter assembly elements, each of the reflective shutter assembly elements including: (i) a reflective shutter, and an output diffractive optical element.

26 Claims, 6 Drawing Sheets

COMPACT DYNAMIC CROSSBAR SWITCH BY MEANS OF PLANAR OPTICS

FIELD AND BACKGROUND OF THE INVENTION

The present invention relates to optical switches and, more particularly, to crossbar switching components for optical signal processing, and to methods of improving optical signal processing by means of such crossbar switching components.

Although fiberoptic systems have been the backbone of the telecommunications industry, their main use to date has been as point-to-point information pipelines. The switching and processing of signals have been accomplished using electronic devices.

Optical cross-connect (OXC) switches are important in optical fiber communications networks, particularly in systems using wavelength division multiplexing (WDM). Optical switches can be divided into two classes, all-optical and optoelectronic. All-optical switches are distinguished by the lack of any electrical conversion of the optical signals being switched. This enables them to be bit rate independent and protocol transparent. In addition, the lack of electrical conversion allows for support of bit rates ranging up to 40 Gb/s and higher, beyond the reach of practical optoelectronic systems.

Crossbar interconnection networks are essential components in a variety of optical signal processing applications, such as communication signal switching and parallel computation. Such applications are described in articles such as that by M. Fukui entitled "Optoelectronic Parallel Computing System With Optical Image Crossbar Switch", in Applied Optics, Vol. 32, pp.6475–6481 (1993), and that by Y. Wu, L. Liu, and Z. Wang, entitled "Optical Crossbar Elements Used For Switching Networks", published in Applied Optics, Vol. 33, pp. 175–178 (1994).

Such crossbar interconnection networks have been incorporated into optical configurations for performing dynamic vector matrix multiplication and arbitrary interconnection between N inputs and M outputs. They take advantage of the speed and the parallelism of optical signal transmission to provide performance levels significantly better than these attainable using microelectronic devices. Several such systems, using discrete components and free space propagation, have been described in the literature, such as by J. W. Goodman, A. R. Dias, and L. M. Woody in "Fully Parallel, High-Speed Incoherent Optical Method For Perfoming Discrete Fourier Transforms", published in Optics Letters, Vol. 2, pp. 1–3 (1978); and by M. Fukui and K. Kitayama in "High-Throughput Image Crossbar Switch That Uses A Point Light Source Array", published in Optics Letters, Vol. 18, pp.376–378 (1993).

Such configurations typically consist of a number of conventional lenses and a dynamic spatial light modulator (SLM). The use of discrete optical components, and the relatively large number thereof required, results in a switch with comparatively high weight and volume. Furthermore, the individual components have to be mounted and aligned mechanically. The alignment accuracy required between individual components is extremely difficult to achieve and often impractical for the high density of channels to be switched. As a result, free space propagation optical crossbar switching systems are very sensitive and non-robust, have relatively low positioning accuracy and are subject to thermal instability, thus making them unsuitable for general industrial use.

All of these factors combine to make such free space switches incompatible with the small size and circuit construction techniques used in the integrated optoelectronic technology used in modern signal processing and communications systems. There is, therefore, need for an optical crossbar switch that combines the speed of optical processing techniques with the small dimensions typical of microelectronic technology.

The problems associated with discrete elements and free space configurations can be alleviated by using planar optics configurations, in which several optical elements (lenses, filters, beam splitters, polarizers, etc.) can be integrated onto a single substrate. The light propagates between the different optical elements, inside the substrate, either by total internal reflection or with the aid of reflective coatings on the substrate surfaces. The alignment of several optical elements integrated onto one substrate can be done with relatively high accuracy during the recording of the elements in the laboratory. Planar optical technology is fully compatible with microelectronic detectors, devices and production technology, with the element patterns being generated by standard microelectronic production techniques such as photolithography and etching.

After surveying the prior art, PCT International Publication No. WO 98/33335 to Reinborn et al. submits that there is no known method wherein an optical crossbar switch can be implemented using planar technology.

PCT International Publication No. WO 98/33335 subsequently discloses an optical crossbar switch with performance typical of conventional bulk component switches, but with a level of compactness compatible with optoelectronic circuit package sizes. The planar optical crossbar switch has two thin planar substrates made of an optical medium such as glass, on each of which is recorded or attached two holographic lenses. The light propagates inside each substrate between the two lenses by means of total internal reflection, or if the surfaces of the substrates are coated with a reflecting layer, by means of specular reflection. The two lenses on each substrate are disposed either on opposite sides of the substrate, or on the same side of the substrate, depending on the optical configuration used. The first lens is a negative cylindrical lens, used to input the incident light signal to the substrate. If this light source is in the form of a linear array, it can be positioned on top of the lens. The second lens is a positive cylindrical lens. The two substrates are disposed at right angles to each other with their positive lenses disposed one on top of the other. A two dimensional array of binary optical switches, acting as a spatial light modulator (SLM), is sandwiched between these two positive lenses, and spatially modulates the light transmission passing through it.

FIG. 1A of the prior art, as disclosed by PCT International Publication No. WO 98/33335, illustrates the input substrate of a planar optical crossbar switch. The substrate 10 is constructed of a transparent optical medium such as glass. A negative holographic cylindrical lens HL1(−) 12 is recorded onto the substrate, or attached thereto, and a linear array 14 of light emitting sources 16, such as light emitting diodes (LED's), is disposed above this lens, such that the light from each source in the array is coupled into the substrate by the lens. Once inside the substrate, the light is trapped by total internal reflection 18, or if the surfaces of the substrate are coated with a reflecting layer, by means of specular reflection. A second holographic lens HL1(+) 20, in this case a positive cylindrical lens, is recorded on the substrate, or affixed to it at a point distant from the first lens, such that the light fanning out from HL1(+) is collimated by HL1(+) and coupled out of the substrate 22. HL1(+) can be disposed on the same side of the substrate as HL1(−), or on the opposite side.

FIG. 1B of the above-referenced patent application publication shows an output substrate 30 of the planar optical crossbar switch. The constriction of this substrate is identical to that of the input substrate, in that it has a positive holographic cylindrical lens HL2(+) 32 at one position of its surface, and a negative holographic cylindrical lens HL2(−) 34 at another. In this second substrate, however, the direction of propagation of the light is opposite, i.e., from HL2(+) to HL2(−). Furthermore, at the output of HL2(−), a linear detector array 36 is disposed, operative to detect the light collected by HL2(−). In FIG. 1A, this detector is drawn at a distance from HL2(−), but it can preferably also be disposed close to or in contact with the substrate.

FIG. 2 shows a complete planar optical crossbar switch, formed by combining two substrates as shown in FIGS. 1A and 1B. The substrates 10, and 30 are aligned at right angles to each other, with their respective positive holographic lenses 20 and 32, aligned one on top of the other, but rotated 90 degrees to each other. A thin planar pixelated spatial light modulator 38, such as a ferroelectric liquid crystal device, is disposed between them. The interposed SLM and substrates can be attached together into one rugged unit, so as to effectively form one continuous substrate assembly. The crossbar switch function is realized by configuring the lenses such that on the input substrate 10, the light from a particular element of the linear source array 14 is spread out across a particular row of the SLM matrix, while on the output substrate 30, since it is rotated to be at right angles to the input substrate, the lenses are operative to converge the light from a particular column of the SLM matrix onto a particular element of the linear output detector array 36.

The above-described device has several distinct disadvantages. A single light source is diffracted by a negative lens, such that the light emitted from the device is spread out along a line (corresponding to a switching matrix array). PCT International Publication No. WO 98/33335 further discloses that the interconnection matrix between arbitrary elements at the input array of the switch to elements of the output detector array is determined by which particular elements of the SLM matrix are on or off. For example, to connect a signal from the ith source in the input array to the jth detector in the output array, the value of the {i,j} pixel of the SLM matrix should be on, i.e., this pixel should be in the transparent state if a transmissive SLM is being used, or in the predetermined reflective state if a reflective SLM is being used.

Thus, the light emanating from the light source is dispersed, while only the light from a singe point (pixel), which corresponds to a small fraction of the input from the light source, actually passes through the switch and for collection and routing on the other side. The remainder of the dispersed light is blocked by the 'off' elements in the SLM matrix. Consequently, despite the advantages inherent in the above-described all-optical switch, the energy inefficiency makes such a switch of very limited practical utility. The problem is particularly severe for large switching arrays, in which the ratio of light output to light input can easily fall below 0.1. Furthermore, the light intensity is not uniform across each row of the SLM matrix, mid therefore light output may vary according to the choice of the {i,j} connection.

There is therefore a recognized need for, and it would be highly advantageous to have, an all-optical switch that is simple and reliable, like the switch disclosed in PCT International Publication No. WO 98/33335, but is significantly more efficient and controlled from an energy standpoint.

SUMMARY OF THE INVENTION

The present invention is an energy-efficient planar optical crossbar switch, and a shutter assembly therefor. Used for routing one or more light sources, the switch has a compactness that is compatible with optoelectronic circuit package sizes. The optical crossbar switch includes two thin planar substrates adapted for the transmission of the light beam ad made of an optical medium such as glass, on each of which is recorded or attached at least two diffractive optical elements. At least one collimated light beam is propagated within each substrate between the diffractive optical elements by means of total internal reflection, or, if the surfaces of the substrate are coated with a reflecting layer, by means of specular reflection. The inventive shutter assembly enables the routing to be performed with substantially no energy loss, in sharp contrast to the system of the prior art.

According to the teachings of the present invention there is provided an optical switch including: (a) a light transmissive substrate and (b) a one-dimensional array, disposed on the light transmissive substrate, the one-dimensional array having a row of reflective shutter assembly elements, each of the reflective shutter assembly elements including: (A) a reflective shutter, and (B) an output diffractive optical element.

According to yet another aspect of the present invention there is provided an optical switch including: (a) a light transmissive substrate and (b) a two-dimensional array, disposed on the light transmissive substrate, the two-dimensional array having rows and columns of reflective shutter assembly elements, each of the reflective shutter assembly elements including: (A) a reflective shutter, and (B) an output diffractive optical element.

According to yet another aspect of the present invention there is provided a method for processing optical signals including the steps of: (a) propagating a collimated light beam within a light transmissive substrate by means of internal reflection; (b) passing at least a portion of the light beam through a shutter assembly including: (i) a reflective shutter and (ii) a diffractive optical element, and (c) directing at least a portion of the collimated light beam to at least one output channel.

According to further features in the described preferred embodiments, the optical switch further includes: (c) an input diffractive element disposed on the light transmissive substrate.

According to still further features in the described preferred embodiments, the optical switch further includes: (c) a light source, operatively connected to the input diffractive element.

According to yet still further features in the described preferred embodiments, the optical switch is designed and configured such that the light source provides collimated light to the input diffractive optical element.

According to yet still further features in the described preferred embodiments, the light source includes a collimating element.

According to still further features in the described preferred embodiments, the optical switch further includes: (c) at least one input diffractive optical element disposed on the light transmissive substrate.

According to still further features in the described preferred embodiments, the optical switch further includes: (d) a one dimensional array of light sources, operatively connected to the input diffractive optical element.

According to yet still further features in the described preferred embodiments, at least one input diffractive optical element is designed and configured to diffract the light sources to produce at least one collimated light beam.

According to yet still further features in the described preferred embodiments, the at least one input diffractive optical element is a single input diffractive optical element.

According to still further features in the described preferred embodiments, the optical switch further includes: (d) a light transmissive output substrate on which are disposed at least a second input diffractive optical element and at least a second output diffractive optical element, the output substrate being operatively connected to the two-dimensional array.

According to still further features in the described preferred embodiments, the optical switch further includes: (e) a sensing monitor, disposed within the light transmissive substrate, for monitoring the second portion of the light beam.

According to still further features in the described preferred embodiments, at least one of the reflective shutter assembly elements is designed and configured to simultaneously transmit a first portion of the light beam and to reflect a second portion of the light beam.

According to still further features in the described preferred embodiments, the reflective shutter includes a reflective liquid crystal display (LCD).

According to still further features in the described preferred embodiments, the reflective shutter includes a microelectromechanical (MEM) system.

According to still further features in the described preferred embodiments, the reflective shutter includes an output diffractive optical element having a diffractive efficiency of substantially less than 100%.

According to still further features in the described preferred embodiments, the reflective shutter includes an output diffractive optical element having a diffractive efficiency of less than 80%.

According to still further features in the described preferred embodiments, the reflective shutter includes an output diffractive optical element having a diffractive efficiency of less than 60%.

According to still further features in the described preferred embodiments, at least one input diffractive optical element is designed and configured to diffract the light sources and to transform at least one partially collimated light source to produce at least one fully collimated light beam.

According to still further features in the described preferred embodiments, the optical switch further includes: (e) a one-dimensional array of output channels, the array being operatively connected to at least a second output diffractive optical element.

According to still further features in the described preferred embodiments, the one-dimensional array of output channels includes entrance apertures of a plurality of optical fibers.

According to still further features in the described preferred embodiments, the one-dimensional array of output channels further includes a focussing lens.

According to still further features in the described preferred embodiments, the method according to the present invention further includes: (d) introducing the collimated light beam into the tight transmissive substrate via an input diffractive optical element prior to step (a).

According to still further features in the described preferred embodiments, the method according to the present invention further includes: (d) passing a light beam through an input diffractive optical element, prior to step (a) to produce the collimated light beam.

According to still further features in the described preferred embodiments, in step (c) of the method, the collimated light beam is introduced into a second light transmissive substrate prior to reaching at least one output channel.

According to still further features in the described preferred embodiments, the method according to the present invention further includes: ((d) reflecting a second portion of the collimated light beam within the light transmissive substrate simultaneously with step (c).

According to still further features in the described preferred embodiments, the method according to the present invention further includes: (e) sensing a residual light by means of at least some of the second portion of the collimated light beam.

According to still further features in the described preferred embodiments, the method according to the present invention further includes: (e) passing at least a third portion of the second portion of the light beam through a second shutter assembly including a reflective shutter and a diffractive optical element, and directing the at least third portion of the collimated light beam to a second output channel.

According to still further features in the described preferred embodiments, the method according to the present invention further includes: (d) propagating a second collimated light beam within the first light transmissive substrate by means of internal reflection, passing at least a portion of the second light beam through a second shutter assembly including a reflective shutter and a diffractive optical element, introducing the second light beam into the second light transmissive substrate, and directing the second light beam to at least one output channel.

The present invention successfully addresses the shortcomings of the existing technologies by providing an all-optical switch that is simple and reliable, and that, from an energy standpoint, is significantly more efficient and controlled than the most advanced switches of the prior art.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1A:
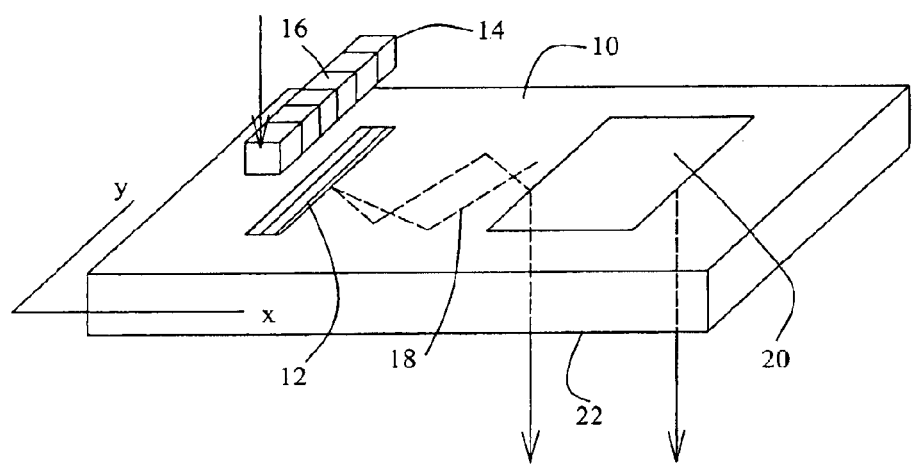
FIG. 1A of the prior art, as disclosed by PCT International Publication No. WO 98/33335, illustrates the input substrate of a planar optical crossbar switch.
Figure 1B:
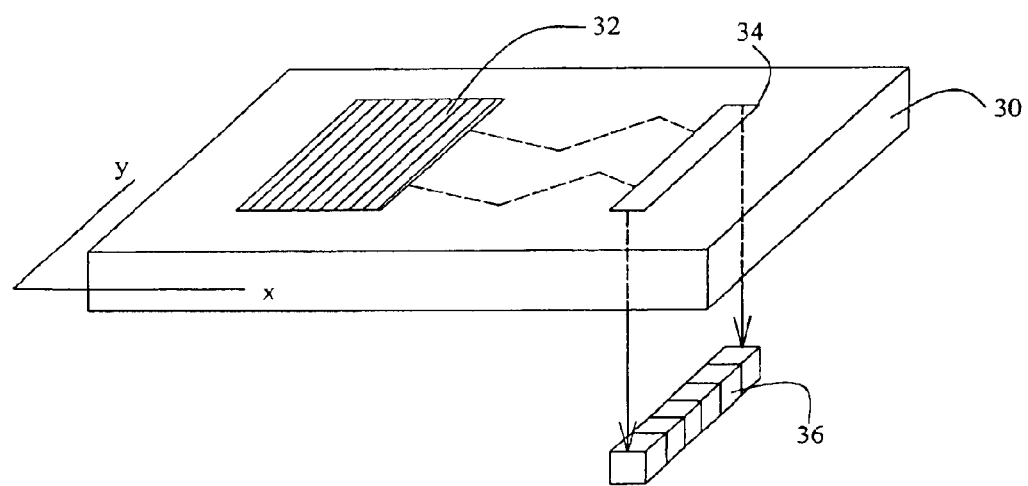
FIG. 1B of the above-referenced patent application publication shows an output substrate of the planar optical crossbar switch.
Figure 2:
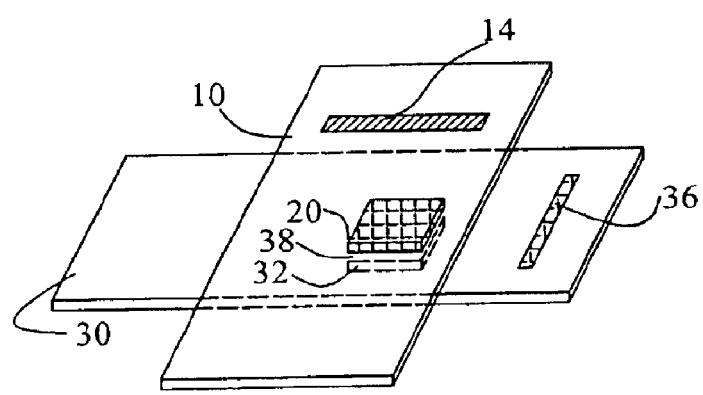
FIG. 2 illustrates a complete planar optical crossbar switch, formed by combining the substrates provided in FIGS. 1A and 1B, according to the above-referenced prior art.

The present invention is an energy-efficient planar optical crossbar switch, and a shutter assembly therefor. The switch has a compactness that is compatible with optoelectronic circuit package sizes. The optical crossbar switch has two thin planar substrates made of an optical medium such as glass, on each of which is recorded or attached at least two diffractive optical elements. The light propagates inside each substrate between the diffractive optical elements by means of total internal reflection, or, if the surfaces of the substrate are coated with a reflecting layer, by means of specular reflection. The inventive shutter assembly enables the routing to be performed with substantially no energy loss, in sharp contrast to the system of the prior art.

It must be emphasized that the planar substrates, as well as any elements disposed therebetween and/or thereon, can be affixed to form a single, sturdy, integral unit.

The principles and operation of the optical crossbar switch according to the present invention may be better understood with reference to the drawings and the accompanying description. Further aspects and advantages of the present invention will also become apparent from the drawings and the detailed description.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

It must be emphasized specifically that, while the following sections of the specification, including the figures and a detailed description thereof, relate primarily to light transmissive substrates, it is to be understood that the principles and discussion are equally applicable to substrates operating by specular reflection.

As described above, PCT International Publication No. WO 98/33335 to Reinhorn et al. discloses an optical crossbar switch based on a planar optics technology. However, the light emanating from the light source is dispersed, such that only a fraction of the light from a single input light source actually passes through the switch as output light. The remainder of the dispersed light is blocked by the "off" elements in the SLM matrix. Consequently, despite the advantages inherent in the above-described all-optical switch, the energy inefficiency makes such a switch of limited practical utility. The problem is particularly severe for large switching arrays, in which the ratio of light output to light input can easily fall below 0.1.

The optical crossbar switch of the present invention, while similarly based on planar optics technology, is constructed according to an inventive design that provides a fundamental solution to the energy-inefficiency problem that is inherent in the prior-art devices.

Figure 3A:
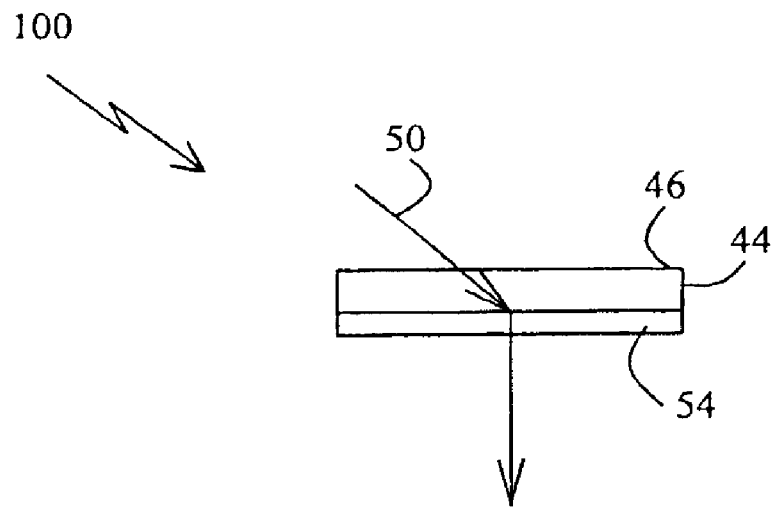
FIGS. 3a–3b illustrate a shutter assembly according to the present invention.
Figure 3B:
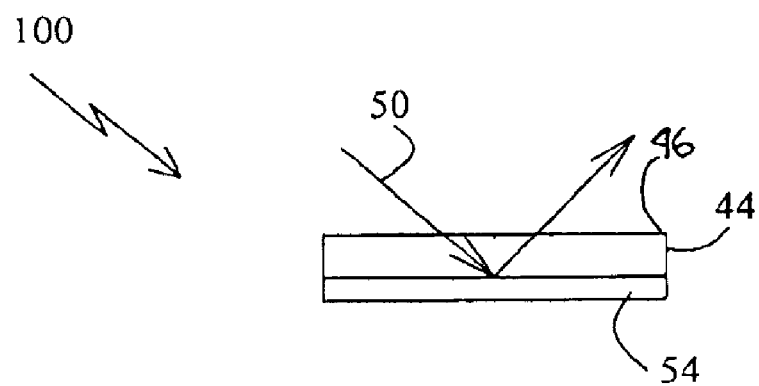

A schematic illustration of a shutter assembly 100 according to the present invention is provided in FIGS. 3a–3b. A shutter 44 is operatively connected to an output diffractive optical element (DOE) 54. A collimated light beam 50 strikes the top surface 46 of shutter 44. Shutter 44, according to one embodiment of the present invention, is designed and configured to either allow light beam 50 to pass through (as in FIG. 3a), when shutter 44 is in an open) state, or to reflect off top surface 46 when shutter 44 is in an closed state (as in FIG. 3b). In a closed state, shutter 44 behaves substantially like the walls of planar substrate 42 (see FIGS. 4a–4c) such that light beam 50 is internally reflected within planar substrate 42. When shutter 44 is in an open state, output DOE 54 diffracts light beam 50, such that the direction of light beam 50 passing through shutter assembly 100 is substantially normal to the plane of shutter 44.

In a preferred embodiment, shutter 44 includes a reflective liquid crystal display (LCD), operatively connected to output (DOE) 54. However, it will be recognized by one skilled in the art that various shutter reflector/transmitter systems can be used to provide the above-described functions. Other preferred embodiments of such a system include a microelectromechanical (MEM) system and a resonant grating waveguide structure.

In another preferred embodiment, shutter assembly 100 is designed and configured to allow a portion of light beam 50 to pass through, with a remaining portion being internally reflected within planar substrate 42. While this can be achieved in various ways, in a presently preferred embodiment, a DOE 54 having a suitable diffraction efficiency is utilized.

In a preferred embodiment, shutter 44 is a proportional shutter that can be controlled, e.g., electrically controlled, thus enabling either an open state (substantially transmissive), a closed state (substantially reflective) or an intermediate state allowing multi-casting and other more sophisticated operations. The use of the above-described features in an optical crossbar switch of the present invention is discussed below.

Figure 4A:
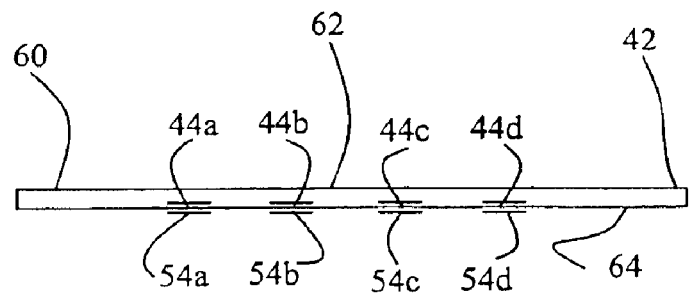
FIGS. 4a–4d illustrate the principle of operation of the inventive optical crossbar switch.
Figure 4B:
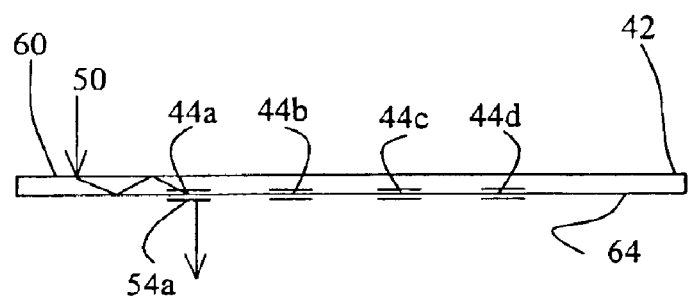
Figure 4C:
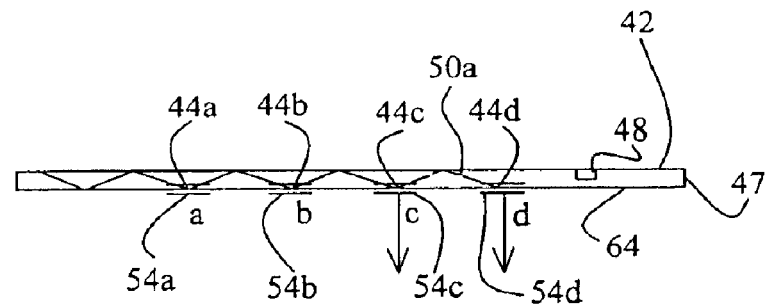

The principle of operation of the inventive optical crossbar switch is illustrated in FIGS. 4a–4c.

FIG. 4a illustrates the main section of the optical crossbar switch, which consists of a thin planar substrate 42 having an input DOE 60, disposed on a broad face 62 of substrate 42, and a plurality of shutters 44a, 44b, 44c, 44d (by way of example), each operatively connected to a respective output DOE 54a, 54b, 54c, 54d, provided on another broad face 64 of substrate 42.

In a preferred embodiment (not show), the output DOEs are disposed on the same broad face as the input DOE.

In FIGS. 4b and 4c, collimated light beam 50 is introduced to substrate 42 through input DOE 60. Light beam 50 is diffracted by means of input DOE 60, such that light beam 50 is propagated within planar substrate 42 by means of total internal reflection. If light beam 50 is not collimated, input DOE 60 may be designed such that it shall also collimate light beam 50 upon entrance into substrate 42. Shutter 44a is disposed on broad face 64 of substrate 42 such that shutter 44a lies in the path of light beam 50. When in an open state (FIG. 4b), shutter 44a enables the entire light beam 50 to pass through to outlet DOE 54a and out of the device. This operation is more fully described in U.S. Pat. No. 5,966,223 to Friesem, et al., which is hereby incorporated by reference for all purposes as if fully set forth herein.

When in a closed state (FIG. 4c), shutter 44a causes light beam 50 to be internally reflected within planar substrate 42. Along the length of broad face 64, shutters 44b, 44c and 44d succeed shutter 44a in series fashion, disposed at an interval such that shutters 44b, 44c and 44d lie in the path of light beam 50. This interval depends, inter alia, on the internal angle of reflection of light beam 50 within substrate 42.

In FIG. 4c, shutter 44a and shutter 44b are closed, and shutter 44c is open, by way of example. Thus, light beam 50 is reflected by shutter 44a, and is further propagated within substrate 42 until striking shutter 44b, where light beam 50 is again reflected. Upon striking shutter 44c, the entire collimated light beam 50 passes through to outlet DOE 54c, which diffracts light beam 50 such that the direction of light beam 50 is substantially normal to the facial plane of substrate 42. The state (i.e., open or closed) of shutter 44d is immaterial in this particular case, as light beam 50 leaves substrate 42 before encountering shutter 44d. However, since the diffraction efficiency of DOE 54c is usually less than 100%, shutter 44d should be in the closed state to prevent "cross talk" between output channel "c" and output channel "d".

This example is readily understood from Table 1, in which the states of the shutter are determined for four different cases:

light output exits solely through the first shutter (44a);
light output exits solely through the second shutter (44b);
light output exits solely through the third shutter (44c);
light output exits solely through the fourth shutter (44d).

TABLE 1

|  | SHUTTER | | | | SHUTTER | | | | SHUTTER | | | | SHUTTER | | | |
| --- | --- | --- | --- | --- | --- | --- | --- | --- | --- | --- | --- | --- | --- | --- | --- | --- |
|  | 1 | 2 | 3 | 4 | 1 | 2 | 3 | 4 | 1 | 2 | 3 | 4 | 1 | 2 | 3 | 4 |
|  | O | | | | C | O | | | C | C | O | | C | C | C | O |
| Light out 1 | + | | | | − | | | | − | | | | − | | | |
| Light out 2 | − | | | | + | | | | − | | | | − | | | |
| Light out 3 | − | | | | − | | | | + | | | | − | | | |
| Light out 4 | − | | | | − | | | | − | | | | + | | | |

O = open state
C = closed state

As mentioned above, it is advised to close all shutters which are unmarked in Table 1 (such as #3 and #4 in the second column from the left) to ensure zero cross talk. Thus, by controlling the state of the various shutters, light beam 50 is routed or switched to any of four optical outputs.

In the above description and in Table 1, it has been assumed that the diffractive efficiency of the DOEs (54a–54d) is substantially 100%, and hence, the state of shutters disposed after the open shutter is almost immaterial, because most of the light that reaches the open shutter diffracts out via the open shutter, and essentially very little light is internally reflected by the DOE of the open shutter.

However, as mentioned above, a DOE 54 having a preselected diffraction efficiency can be utilized to enable a portion of light beam 50 to pass through, with a remaining portion being internally reflected within planar substrate 42. In this case (unlike the case of Table 1), the state of shutters disposed after the open shutter is important.

Several examples of this embodiment of the invention are presented in Table 2. In case A, shutters 2, 3, and 4 must be closed in order to prevent internally reflected light from shutter 1 to pass through. In case B shutter 2 and shutter 4 are open, and shutter 1 and shutter 3 are closed, such that a portion of the input light beam passes through shutter 2 and second portion passes through shutter 4.

The relative amount of light passing through each shutter is a strong function of the diffractive efficiency of the various DOEs. One skilled in the art will readily recognize that it is possible to design the system with each DOE having a particular diffractive efficiency so as to achieve a desired result (e.g., the relative intensity of the light beam passing through each shutter).

Figure 5A:
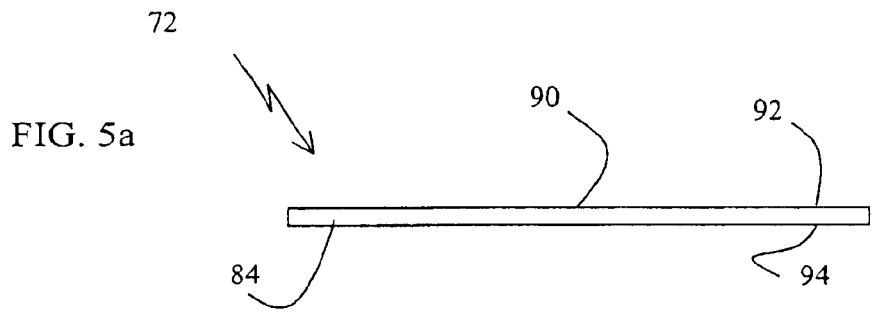
FIGS. 5a–5c show preferred embodiments of a thin planar output substrate of the optical crossbar switch according to the present invention.
Figure 5B:
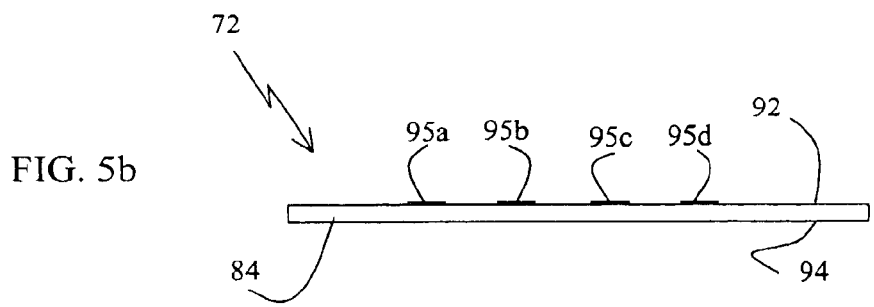
Figure 5C:
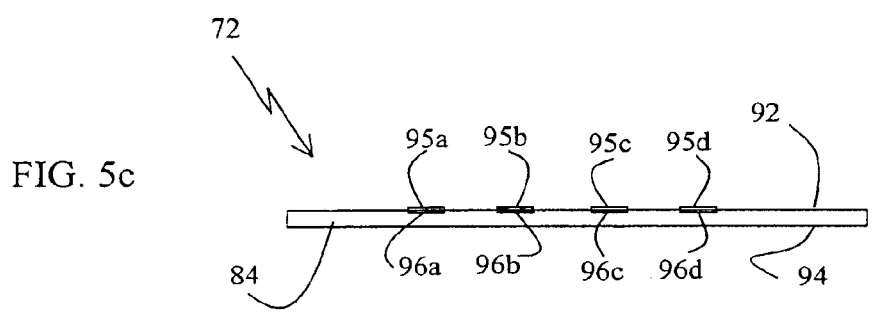

In an alternative preferred embodiment shown in FIG. 5c, any or all of DOEs 95a–95d are respectively replaced by

TABLE 2

| | A SHUTTER | | | | B SHUTTER | | | | C SHUTTER | | | | D SHUTTER | | | |
|---|---|---|---|---|---|---|---|---|---|---|---|---|---|---|---|---|
| | 1 | 2 | 3 | 4 | 1 | 2 | 3 | 4 | 1 | 2 | 3 | 4 | 1 | 2 | 3 | 4 |
| | O | C | C | C | C | O | C | O | C | C | O | O | O | C | O | O |
| Light out 1 | + | | | | − | | | | − | | | | + | | | |
| Light out 2 | − | | | | + | | | | − | | | | − | | | |
| Light out 3 | − | | | | − | | | | + | | | | + | | | |
| Light out 4 | − | | | | + | | | | + | | | | + | | | |

In another preferred embodiment, shutters which open fractionally or completely in response to a pre-determined control, such as the voltage level applied to them, may enable selective controlled multi-casting. Multi-casting is the controlled emission of light through more than one output channel, either in equal intensities, or in controlled (for example, electronically or mechanically) non-equal intensities.

In a preferred embodiment, at least one of shutters 44a–44d is designed and configured to reflect a portion of light beam 50 when the shutter is in an open state. Thus, in the case of FIG. 4c, a portion 50a of light beam 50 striking open shutter 44c is reflected within substrate 42. Light beam 50a is then propagated within substrate 42, proceeding to another shutter, e.g., shutter 44d, and exiting substrate 42 via DOE 54d.

In another preferred embodiment, a sensor 49 or the like is disposed within substrate 42 or near the far end 47 of substrate 42, preferably past the shutter farthest from the input DOE, such that a portion of the internally reflected light is absorbed by the sensor 49. This light can be used to control or validate the transmission of light in that input channel, or, if the light is modulated, to control the modulation.

Figure 4D:
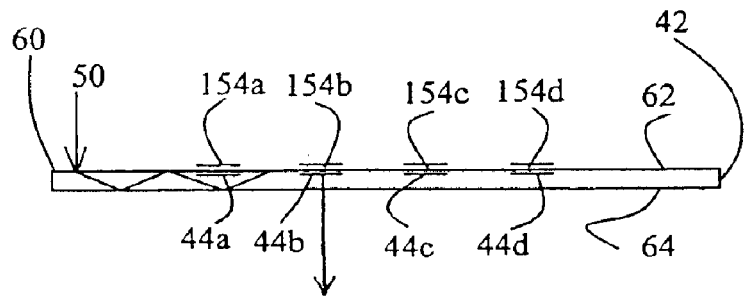

As mentioned above, although the figures and associated text generally describe transmissive DOEs, DOEs that are operative in reflective mode are equally applicable. By way of example, such reflective DOE's would be disposed on the top broad face 62 of substrate 42, as shown in FIG. 4d. In FIG. 4d, shutter 44a is closed, and shutter 44b is open, also by way of example. Thus, light beam 50 is reflected by shutter 44a, and is further propagated within substrate 42 until striking and passing through shutter 44b. DOEs 154a–154d are reflective, hence, light beam 50 is reflected off DOE 154b such that light beam 50 passes through substrate 42 through bottom broad face 64 in a substantially perpendicular fashion to the facial plane of substrate 42.

FIGS. 5a and 5b show preferred embodiments of a thin planar output substrate 72 of the optical crossbar switch of the present invention. Output substrate 72 has an input DOE 90, disposed on a broad face 92 of substrate 72, and an output DOE 84, disposed on a second broad face 94 of substrate 72. It should be emphasized, however, that output DOE 84 could be disposed on the same broad face 92 as input DOE 90. Output substrate 72 can be substantially identical to the output substrate disclosed in PCT International Publication No. WO 98/33335, which is hereby incorporated by reference for all purposes as if fully set forth herein.

In a preferred embodiment shown in FIG. 5b, input DOE 90 of FIG. 5a is replaced by a plurality of small input DOEs 95a–95d.

shutters 96a–96d, which are disposed on broad face 92, and by planar DOEs 95a–95d, which are disposed above and operatively connected to the respective shutters 96a–96d.

Figure 6A:
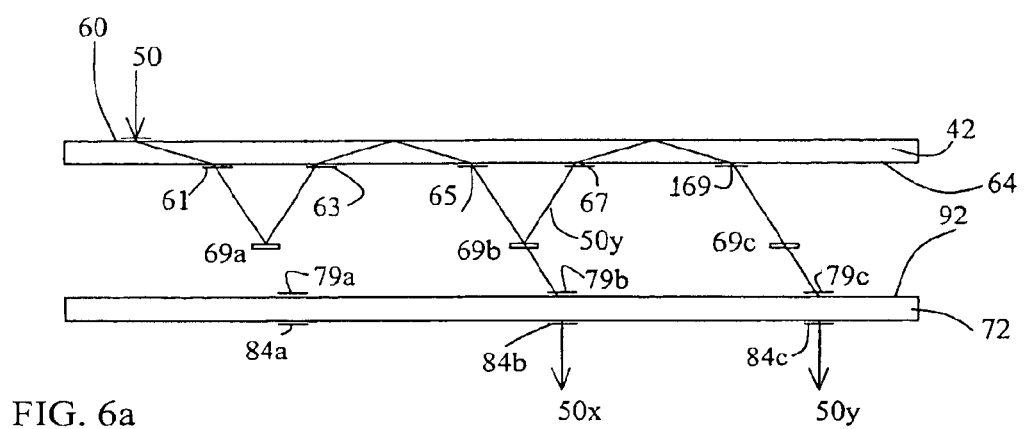
FIG. 6a is a schematic illustration of a switching system in which the reflective shutters are disposed outside of and in between the light transmissive substrates.

FIG. 6a illustrates a switching configuration according to the present invention including input substrate 42 having input DOE 60, and output substrate 72, having output DOE 84. Between input substrate 42 and output substrate 72 are disposed reflective shutter 69a and reflective shutter 69b. Operatively connected to reflective shutter 69a are DOEs 61 and 63, both of which are disposed on the bottom broad face of input substrate 42, and DOE 79a, disposed on the top broad face of output substrate 72. Similarly, operatively connected to reflective shutter 69b are DOEs 65 and 67, which are disposed on the bottom broad face 64 of input substrate 42, and DOE 79b, disposed on the top broad face 92 of output substrate 72.

In FIG. 6a, reflective shutter 69a is closed, and reflective shutter 69b is open, by way of example. Thus, input light beam 50 is diffracted within substrate 42, striking and being diffracted out of substrate 42 by DOE 61. Light beam 50 subsequently reflects off closed shutter 69a, and reenters substrate 42 via DOE 63. After internal reflection within substrate 42, light beam 50 again exits substrate 42, this time via DOE 65, associated with shutter 69b. Because shutter 69b is in an open state, light beam 50 passes through to DOE 79b, and is diffracted into output substrate 72. Following internal propagation within output substrate 72, light beam 50 exits output substrate 72 via outlet DOE 84, which diffracts light beam 50 such that the direction of light beam 50 is substantially normal to the facial plane of substrate 72.

In a preferred embodiment, shutter 69b, by way of example, is designed and configured to reflect a portion of light beam 50 when in an open state. Thus, in the case of FIG. 6a, a portion 50y of light beam 50 striking open shutter 69b is reflected, and reenters substrate 42 via DOE 67. Light beam 50y is then propagated within substrate 42, proceeding via DOE 169 to open shutter 69c. The light beam 50y passing through shutter 69c enters output substrate 72 via DOE 79c; the light beam 50x passing through shutter 69b (i.e., a portion of light beam 50) enters output substrate 72 via DOE 79b. Light beams 50x, 50y are propagated through output substrate 72 until they exit output substrate 72 via output DOEs 84b and 84c, respectively. It should be noted, however, that because output substrate 72 is positioned in an orthogonal fashion with respect to substrate 42, the internal propagation within output substrate 72 is not observed from the vantage point of FIG. 6a.

It should be emphasized that the wavelengths of light entering input substrate 42 can be within the range of wavelengths used in optical communication networks, including the 850 nm range, the 1310 nm range and the 1550 nm range. The optical elements thus described (transmissive substrate, DOE and shutter) should be adapted to operate in the selected communication range. It should be noted, however, that within each communication range the optical elements should be adapted to operate in a wavelength window of 100 nm, preferably in a wavelength window of 80 nm, and most preferably in a wavelength window of 32 nm around a pre-defined central wavelength.

Figure 6C:
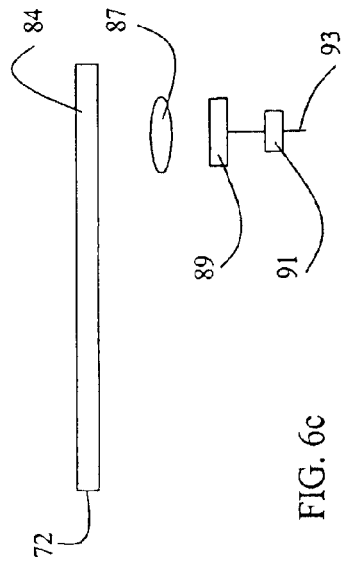
FIG. 6c is a schematic illustration of an output substrate operatively connected to an output channel according to a preferred embodiment of the present invention.
Figure 6B:
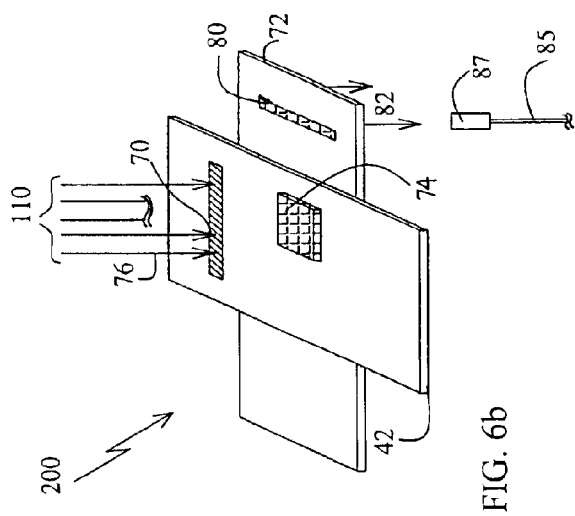
FIG. 6b is a schematic illustration of a switching system for switching light beams from a plurality of optical inputs to a plurality of optical outputs.

When light beams from a plurality of optical inputs require switching to a plurality of optical outputs, it is convenient to provide a linear array of light sources 110 via input DOE 70 to substrate 42, as illustrated in the optical crossbar switch 200 provided in FIG. 6*b*. An output substrate 72 is associated with substrate 42, such that the facial planes of substrates 42, 72 are aligned in an orthogonal fashion. A two-dimensional array 74 of shutter assembly elements, each element including a reflective shutter 44 and an output DOE 54, is disposed on a bottom face 64 of substrate 42. The orthogonal alignment of the facial planes of substrates 42, 72 provides a crossbar geometry in which a light beam 76 from any particular element of linear array of light sources 110 can be routed to one or more shutter assembly elements within a particular row of two-dimensional array 74. From two-dimensional array 74, light beam 76 enters output substrate 72 via one or more input DOEs (input DOEs on output substrate 72 are shown in FIG. 5*b* as 95*a*–95*d*), the input DOEs being operative to diffract light beam 76 from a particular column of two-dimensional array 74 through output substrate 72 and onto a one-dimensional array 80 containing output DOE 84.

In an alternative preferred embodiment of the present invention, shutters 96 are disposed between input DOEs 95 and output substrate 72. Maintaining the shutters 96 closed except for that through which particular light beam 76 enters output substrate 72 prevents light beam 76 from diffracting out of substrate 72 unintentionally, before reaching output DOE 84.

Output DOE 84 diffracts light beam 76 to produce an output light beam 82 that is substantially normal to the plane of substrate 72. Output light beam 82 exiting optical crossbar switch 200 can readily be transferred to an output channel, which in FIG. 6*b*, by way of example, includes optical fiber 85, preferably via lens 87. Preferably, lens 87 is a Grin lens, a ball lens or another lens known to be compatible to those skilled in the art.

The aperture of optical fiber 85 is extremely small, such that output light beam 82 exiting optical crossbar switch 200 may require focussing. In a preferred embodiment, the focussing is performed solely by lens 87.

In another preferred embodiment, output DOE 84 is designed and configured to perform the focussing function without axiliary focussing devices.

In yet another preferred embodiment, output DOE 84 is designed and configured to perform the focussing function along with lens 87, which complements and completes the focussing performed by output DOE 84.

In yet another preferred embodiment, provided in FIG. 6*c*, the output channel is an assembly consisting of a lens 87, detector 89, amplifier 91, and copper wire 93. In this case, the signal transferred to the copper wire is an RF signal.

Figure 7:
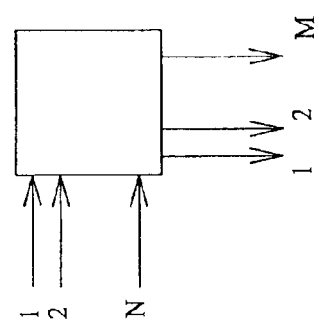
FIG. 7 provides a schematic diagram depicting the function of the above-described inventive optical crossbar switch.

A schematic diagram depicting the function of the above-described inventive optical crossbar switch 200 is provided in FIG. 7. A total of N individual light inputs can be introduced (via a linear array, as shown in FIG. 6*b*) to optical crossbar switch 200, wherein these of N individual light inputs are operatively connected to a total of M individual light outputs.

According to the system and method of the present invention, dynamic routing of multiple signals is achieved by switching the shutter assembly elements in an appropriate manner. Moreover, interconnection schemes other than N:M are possible, such as one input to M outputs (multi-casting), N inputs to one output (combining), or more generally, (N-X) inputs to M outputs or N inputs to (M-Y) outputs, X being an integer smaller than N, Y being an integer smaller than M, and wherein X and Y are greater than or equal to 1.

For some applications, the combining interconnection scheme is only effective for N inputs wherein each of the inputs has a different characteristic wavelength.

The collimation of the input light can be achieved using diffractive elements of various kinds, including:

1) a DOE disposed on the surface of the substrate having the requisite optical properties;
2) a lens disposed at the end of the optic fiber carrying the light source, e.g., a ball lens or Grin (graded index) lens;
3) an integrated collimation element including a lens disposed at the end of the optic fiber followed by a DOE disposed on the surface of the substrate and having at least some of the requisite optical properties.

Figure 8:
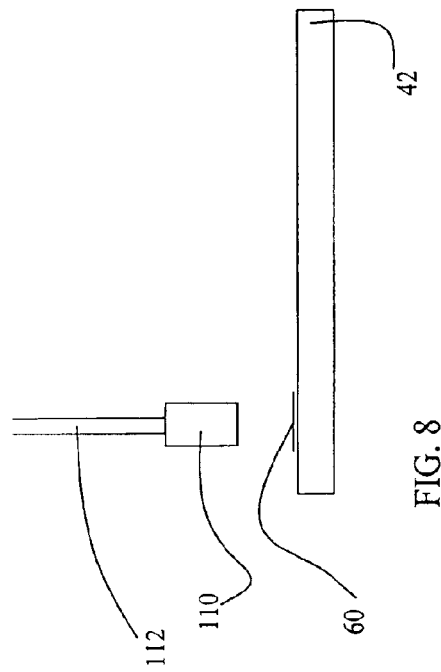
FIG. 8 is a schematic illustration of an integrated collimation element for utilization in conjunction with the device and method of the present invention.

In the case of the integrated collimation element (shown in FIG. 8), the requirements on the lens 110 disposed at the end of the optic fiber 112 and the requirements on the DOE 60 disposed on the surface of the substrate 42 are substantially more relaxed than the requirements for either optical element functioning alone.

As used herein in the specification and in the claims section that follows, the phrase "substantially total internal reflection" refers to a total reflection with the limitation that in some cases due to impurities, defective polishing, etc., some of the light is not reflected but escapes from the planar substrate. These phenomena are well known in the art. In fact a true total internal reflection (i.e., 100% of the light being reflected) is theoretical. However, loss of up to a few percent (e.g., less than 30%, preferably less than 10%, most preferably less than 1%) of the light is tolerated and is included under the definition of "substantially total internal reflection", as used herein.

As used herein in the specification and in the claims section that follows, the term "reflective shutter" and the like refer to a shutter, operatively connected to a light transmissive substrate, which is designed and configured such that, when the shutter is in an open state, a light beam passes through, and when the shutter is in a closed state, the light beam is reflected (e.g., back into the light transmissive substrate). The shutter may include, by way of example, an LCD element, a mirror element, or other elements known to those skilled in the art.

As used herein in the specification and in the claims section that follows, the term "collimating element" and the like refer to an element producing a collimated light beam. The collimating element may include, by way of example, a collimating lens or a laser.

Additional examples of holographic substrates are found for example in A. A. Friesem and Y. Amitai (1996) in "Trends in Optics". A Consortini, Ed. Academic Press, NY, pp. 125–144, which is incorporated by reference as if fully set forth herein. Specifically, various embodiments of holographic plates or substrates described in the above cited reference are herein incorporated by reference.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in ibis specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An optical switch comprising:
   (a) a light transmissive substrate, and
   (b) a two-dimensional array, disposed on said light transmissive substrate, said two-dimensional array having rows and columns of reflective shutter assembly elements, each of said reflective shutter assembly elements including:
      (i) a reflective shutter, and
      (ii) an output diffractive optical element, and
   (c) a light transmissive output substrate on which are disposed at least an input diffractive optical element and at least a second output diffractive optical element, said output substrate being operatively connected to said two-dimensional array.

2. The optical switch of claim 1, further comprising:
   (d) at least one input diffractive optical element disposed on said light transmissive substrate.

3. The optical switch of claim 2, wherein said input diffractive optical element disposed on said light transmissive substrate is a reflective diffractive optical element.

4. The optical switch of claim 2, wherein said input diffractive optical element disposed on said light transmissive substrate is a transmissive diffractive optical element.

5. The optical switch of claim 1, wherein said output diffractive optical element is a reflective diffractive optical element.

6. The optical switch of claim 1, wherein said output diffractive optical element is a transmissive diffractive optical element.

7. The optical of claim 2, wherein said at least one input diffractive optical element disposed on said light transmissive substrate is a single input diffractive optical element.

8. The optical switch comprising:
   (e) a one dimensional array of light sources, operatively connected to said input diffractive optical element disposed on said light transmissive substrate.

9. The optical switch of claim 7, comprising:
   (e) a light source, operatively connected to said input diffractive optical element disposed on said light transmissive substrate.

10. The optical switch of claim 1, further comprising:
    (d) a one dimensional array of light sources, operatively connected to said light transmissive substrate, said array being designed and configured for directing at least one light beam into said light transmissive substrate.

11. The optical switch of claim 10, wherein said light sources are substantially collimated.

12. The optical switch of claim 10, further comprising:
    (e) at least one collimation element operatively connected to said light transmissive substrate.

13. The optical crossbar switch of claim 12, wherein said at least one collimation element is an input diffractive optical element.

14. The optical crossbar switch of claim 12, wherein at least one of said reflective shutter assembly elements is designed and configured to simultaneously transmit a first portion of said light beam and to reflect a second portion of said light beam.

15. The optical crossbar switch of claim 14, further comprising:
    (f) a sensing monitor, operatively connected to said light transmissive substrate, for monitoring said second portion of said light beam.

16. The optical crossbar switch of claim 1, wherein said reflective shutter includes a reflective liquid crystal display (LCD).

17. The optical crossbar switch of claim 1, wherein said reflective shutter is equipped with control means for controlling said shutter.

18. The optical crossbar switch of claim 17, wherein said control means provide said shutter with an open, substantially transmissive state, a closed, substantially reflective state, and at least one intermediate state, said intermediate state being partially reflective and partially transmissive to a light beam passing through said shutter.

19. The optical crossbar switch of claim 1, wherein said reflective shutter includes a micro-electromechanical (MEM) system.

20. The optical crossbar switch of claim 1, wherein said output diffractive optical element has a diffractive efficiency of substantially less than 100%.

21. The optical crossbar switch of claim 1, wherein said output diffractive optical element has a diffractive efficiency of less than 80%.

22. The optical crossbar switch of claim 1, wherein said output diffractive optical element has a diffractive efficiency of less than 60%.

23. The optical crossbar switch of claim 8, wherein said at least one input diffractive optical element is designed and configured to diffract light beams produced by said light sources and to transform at least one partially collimated light source to produce at least one fully collimated light beam.

24. The optical crossbar switch of claim 1, further comprising:
    (d) a one-dimensional array of output channels, said array being operatively connected to said at least a second output diffractive optical element.

25. The optical crossbar switch of claim 24, wherein said one-dimensional array of output channels includes entrance apertures of a plurality of optical fibers.

26. The optical crossbar switch of claim 25, wherein said one-dimensional array of output channels further includes a focusing lens.

* * * * *